United States Patent [19]

Atsuta et al.

[11] Patent Number: 4,699,309
[45] Date of Patent: Oct. 13, 1987

[54] METHOD OF BONDING DISSIMILAR MATERIALS

[75] Inventors: Toshio Atsuta, Akashi; Takeshi Yamada, Kobe, both of Japan

[73] Assignee: Kawasaki Jukogyo Kabushiki Kaisha, Hyogo, Japan

[21] Appl. No.: 868,103

[22] Filed: May 29, 1986

[51] Int. Cl.⁴ .................. B23K 20/24; B23K 20/02
[52] U.S. Cl. .................................... 228/116; 228/205
[58] Field of Search ............... 228/116, 193, 203, 205, 228/210, 49.1

[56] References Cited

U.S. PATENT DOCUMENTS

| | | | |
|---|---|---|---|
| 3,300,838 | 1/1967 | Slater et al. | 228/205 |
| 3,571,907 | 3/1971 | Watson | 228/205 |
| 3,612,389 | 10/1971 | Green | 228/49.1 |
| 3,639,974 | 2/1972 | Finnegan | 228/205 |
| 4,200,217 | 4/1980 | Imai et al. | 228/205 |

Primary Examiner—M. Jordan
Attorney, Agent, or Firm—Wenderoth, Lind & Ponack

[57] ABSTRACT

A pair of soft-metal blocks are placed side by side constrainingly on a stationary platen with a space therebetween such that the opposing flank surfaces of the blocks confront each other. Into the space is pressed downward by a movable platen a hard-metal block which has opposing flank surfaces having sharp edges at the lower ends thereof, respectively, the opposing flank surfaces also tapering correspondingly. As the hard-metal block is moved forcibly into the space, the edges operate to pare or peel respective surface layers of the opposing flank surfaces of the soft-metal blocks thereby to create respective fresh surfaces of the soft-metal blocks. The opposing flank surfaces of the hard-metal block are therefore pressed strongly against the fresh surfaces, respectively, as the hard-metal block advances, and strong diffusion welded joints are produced. The method is carried out at elevated temperature.

15 Claims, 24 Drawing Figures

METHOD OF BONDING DISSIMILAR MATERIALS

BACKGROUND OF THE INVENTION

This invention relates generally to techniques for joining one material to a different material and more particularly to a method of bonding together dissimilar materials, which is highly suitable for fabricating transition insert material for use in, for example, liquefied natural gas (LNG) freighters.

As a transition insert material, a composite member formed by bonding together an aluminum alloy and a stainless steel is ordinarily used. Since the fabrication of such a composite member by a fusion welding method is impossible, it is quite natural to consider the application of a diffusion welding method as an alternative. However, because the surface oxide of aluminum is extremely resistant to joining, it is necessary to raise the diffusion welding temperature to a value immediately below the melting point of aluminum in the case of diffusion welding of aluminum and steel, and even in the diffusion welding mutually between aluminum base materials.

In the case wherein the welding temperature is raised in this manner in the bonding together of the dissimilar materials, aluminum and steel, a brittle intermetallic compound of Al-Fe base is formed at the juncture therebetween, and the formation of a joint having ample reliability cannot be achieved.

According to results of our tests, when the diffusion welding temperature is low in the case of Al-Fe diffusion welding, the bond strength is almost zero, and when the welding temperature is raised, the bond strength is low and deviates over a wide range.

For these reasons, transition inserts are being fabricated simply by explosion welding in spite of the excellent economy of diffusion welding. As a consequence, transition inserts are extremely high in price in the present state of the art. Moreover, explosion welding is disadvantageous in that the kinds of aluminum alloys which can be used are restricted, and the materials cannot be freely selected. Furthermore, since the thickness of a member which can be thus explosion welded is limited, transition insert material of the desired thickness cannot be fabricated in all cases, whereby the assembly welding work must be carried out at the work site with due consideration of the heat transmission to the joint interface of the explosion welded transition insert. This gives rise to a problem in work efficiency and productivity.

SUMMARY OF THE INVENTION

In view of the above described circumstances in the art, it is an object of this invention to provide a method of bonding together dissimilar materials, especially a soft metal such as aluminum or an aluminum alloy and a hard metal such as a stainless steel, by which method a high joint strength between the joined members can be attained in a relatively simple and economical manner and, moreover, without limitation of the kinds and thicknesses of the materials to be joined.

According to this invention, briefly summarized, there is provided a method of bonding a hard-material structure to a soft-material structure, both in solid form, which comprises the steps of paring or peeling a surface layer of the soft-material structure with an edge of a bonding surface of the hard-material structure thereby to create a fresh surface of the soft-material structure, and pressing together said bonding surface of said fresh surface.

The nature, utility, and further features of this invention will be more clearly apparent from the following detailed description when read in conjunction with the accompanying drawings, briefly described below.

DETAILED DESCRIPTION OF THE INVENTION

The method of this invention will now be described with respect to preferred embodiments thereof.

Figures 1A, 1B, 1C:
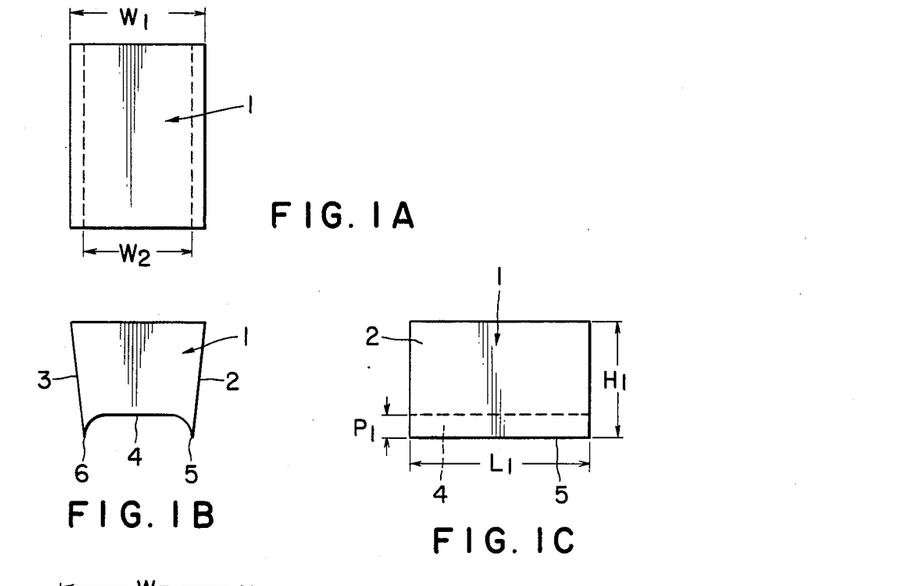
FIGS. 1A, 1B and 1C are respectively a plan view, an end view, and a side view showing one example of a hard-metal block to be used in the practice of the method of this invention.

In a first embodiment of the invention, a hard-metal block is bonded on opposite sides thereof to soft-metal blocks. One example of the hard-metal block is generally designated by reference numeral 1 in FIGS. 1A, 1B and 1C. The block 1 is machined from a hard metal such as stainless steel, Japanese Industrial Standards (JIS) designation SUS 304 (containing, inter alia, 0.08% max. C, 8.00 to 10.50% Ni, 18.00 to 20.00% Cr). This block 1 has rectangular shapes in plan and side views and has planar surfaces at its top, opposite side flanks, and opposite ends. The two side flank surfaces mutually converge from the top downward, thus constituting taper parts 2 and 3. The bottom surface 4 is concave with a substantially planar middle portion and substantially hollow cylindrical side portions, which at their outer extremities form acute edges 5 and 6 with the bottom extremities of the flank taper parts 2 and 3, respectively. Accordingly, the block 1 has a cross section as shown in FIG. 1B, in the shape of an inverted truncated isosceles triangle with a concavely curved bottom ending in cusps at its outer ends. As described hereinafter, the flank taper parts 2 and 3 are surfaces to be bonded to a soft metal and are therefore finished smoothly.

Specific dimensions of the block 1 in this example are: length, L1=38; height, H1=25; upper width, W1=30; distance between edges 5, 6, W2=26; and depth of concave bottom 4, P1=5, all dimensions being in mm.

Figure 2A:
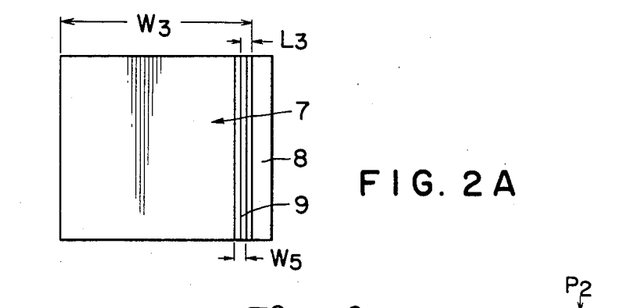
FIGS. 2A, 2B and 2C are respectively a plan view, an end view and a side view showing one example of a soft-metal block to be used in the practice of the method of the invention.
Figure 2B:
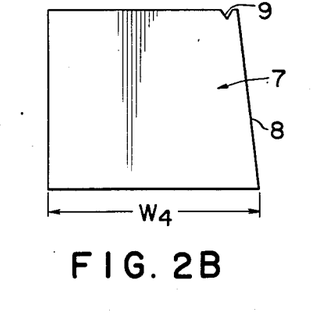
Figure 2C:
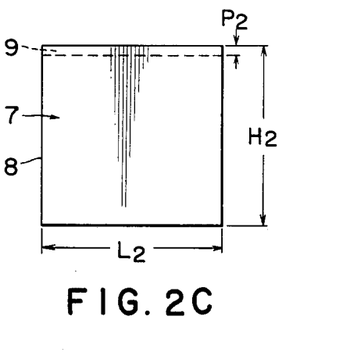

Each of the soft-metal blocks is designated by reference numeral 7 in FIGS. 2A, 2B and 2C, and has the shape of a rectangular parallelepiped, the surfaces of which, except for the end faces, are rectangular. The block 7 is machined from a soft metal such as an aluminum alloy, JIS designation A 5083, for example. (The chemical compositions of this aluminum alloy and others mentioned herein are set forth at the end of this descriptive part.) One side flank surface 8 of each block 7 is inclined to diverge from the opposite flank surface from the top downward and constitutes a taper part 8. A V-shaped groove 9 extending in the longitudinal direction of the block 7 is formed in the top surface thereof at a position near the upper edge of the taper part 8.

Specific dimensions of the block 7 in this example are: length, L2=40; height, H2=40; upper width, W3=42; lower width, W4=45.2; groove width, W5=2; groove depth, P2=2; and horizontal distance between center of groove and upper edge of taper part, L3=2, all dimensions being in mm.

Figure 3:
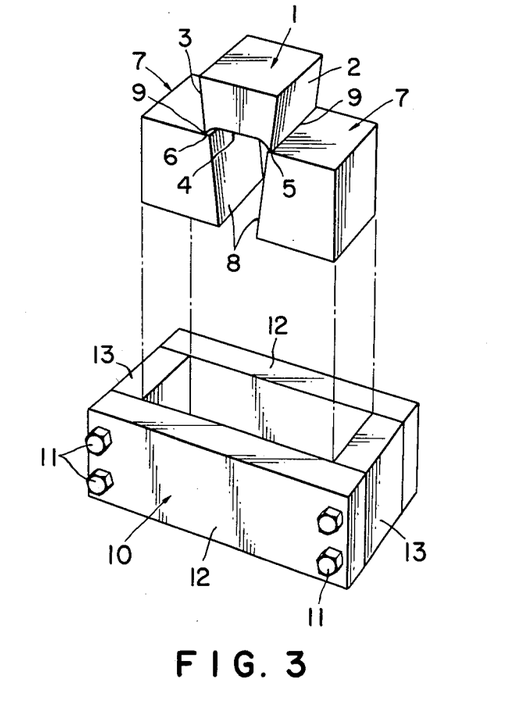
FIG. 3 is a perspective view showing one example of a jig for bonding to be used in the practice of the method of the invention and indicating the manner in which blocks as illustrated in FIGS. 1A through 2C are assembled and fitted into the jig.

The above described soft-metal blocks 7 are bonded to opposite sides of the above described hard-metal block 1 according to this invention by means of a jig, one example of which is illustrated in FIG. 3 and designated by reference numeral 10. This jig 10 is essentially in the form of a box-like frame comprising four side walls 12 and 13 detachably assembled and rigidly held by a suitable member of bolts 11. These four walls in assembled state form therewithin a space of the shape of a rectangular parallelepiped, into which one hard-metal block 1 and two soft-metal blocks 7 are placed as indicated in FIG. 3.

More specifically, as shown in FIG. 3, the two soft-metal blocks 7 are so oriented and positioned that their respective taper parts 8 are facing each other, and, at the same time, the hard-metal block 1 is placed on top thereof with its edges 5 and 6 fitted in the grooves 9 of respective soft-metal blocks 7. With the three blocks 7, 1, 7 in the above described state, bonding thereof is carried out in the following manner.

Figure 4:
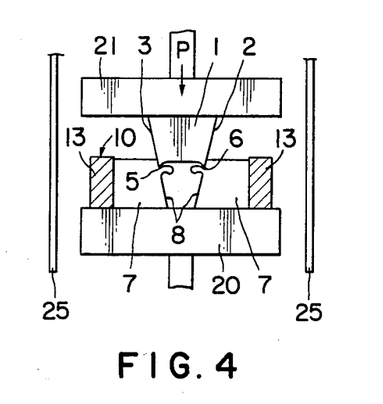
FIG. 4 is an elevational view, partly in section, showing the manner in which soft-metal blocks are being pared or peeled by edges of a hard-metal block while being heated.

The jig 10 with the three blocks 7, 1, 7 placed therein may be fixedly secured to the upper surface of a stationary platen 20 as shown in FIG. 4. A movable platen 21 is provided above the stationary platen 20 which is adapted to be moved downward by means of a hydraulic cylinder 22 shown in FIG. 5. The platens 20 and 21 are disposed in a furnace 23 which is housed in a vacuum chamber 24. A pair of opposing electric heaters 25 of radiation type are installed on opposite sides of the platens 20 and 21 and within the furnace 23. The heaters 25 are connected to a power supply 26.

Figure 5:
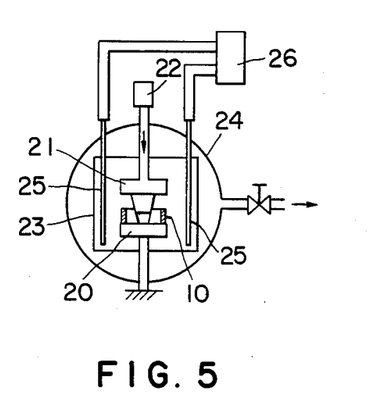
FIG. 5 is a schematic view showing a furnace and a vacuum chamber which encase therein the assembly shown in FIG. 4.

To carry out the method of this invention, the interior of the vacuum chamber 24 is evacuated to a vacuum of the order of $10^{-4}$ Torr, which is maintained throughout the succeeding steps.

The blocks 7, 1, 7 are heated by the heaters 25 to a temperature preferably in the range of 200° to 450° C., and more preferably in the range of 250° to 350° C., and, with the blocks in a thus heated state, the hard-metal block 1 is pressed downward by means of the movable platen 21. As this block 1 thereby descends, its edges 5 and 6 function as cutting tools to pare or peel off surface layers beneath the taper parts 8 of the soft-metal blocks 7, as shown in FIG. 4 thereby to expose fresh surfaces, which simultaneously are forced into intimate contact with the taper surfaces 2 and 3 of the hard-metal block 1.

Specific values of required pressing force P and bonding temperature T in this example of bonding process are: P=21.5 metric tons when T=300° C.; P=20.3 metric tons when T=350° C.; P=15.6 metric tons when T=400° C.; and P=12.6 metric tons when T=450° C. Thus, the pressing force P required decreases with increasing bonding temperature T.

With the blocks 7, 1, 7 in this state, wherein the fresh surfaces of the soft-metal blocks 7 have been forced into close contact with the taper surfaces 2 and 3 constituting bonding surfaces of the hard-metal block 1, the pressing force P is reduced to a holding force, which is of the order of 1/6 of the above mentioned pressing force P, and which is then sustained for a period of the order of 30 minutes to 1 hour. Thereafter, the blocks are cooled, whereupon the diffusion welding thereof is completed.

Figure 7:
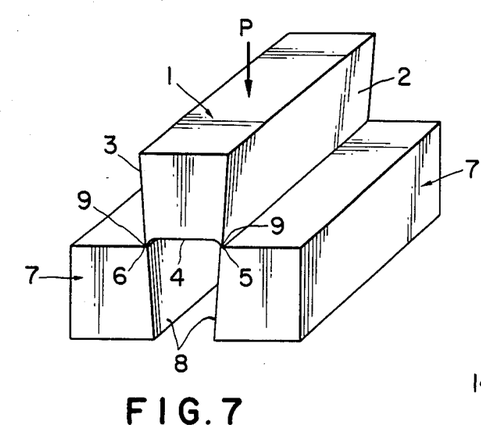
FIGS. 7, 8 and 9 are perspective views for a description of the process of fabricating a transition insert material according to the invention, FIG. 7 showing the relative positional arrangement of two kinds of blocks, FIG. 8 indicating the states of cutting the bonded members, and FIG. 9 showing a transition insert material obtained after the cutting.
Figure 8:
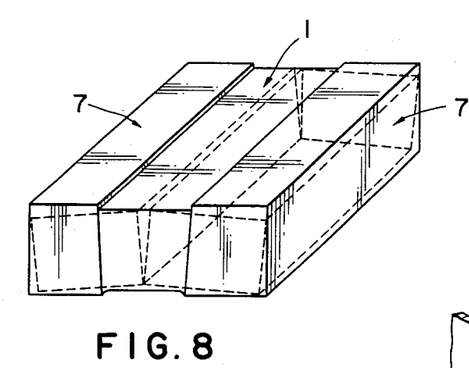

A specific example of practice in fabricating a transition insert material (A 5083+SUS 304, JIS) by the above described bonding method will now be described. As shown in FIG. 7, blocks 7, 1, 7 of cross sections similar to those described hereinabove but of somewhat longer lengths are used in this case. The widths of these blocks 7, 1, 7 are of an order slightly greater than 150 mm, and their lengths are of the order of 500 mm. By forming fresh surfaces at a temperature of 300° C. and a pressing force of 283 metric tons, the two kinds of blocks were bonded together. Then, as indicated in FIG. 8, the composite material thus bonded was cut as shown by the broken line to obtain two pieces of a transition insert material M as shown in FIG. 9.

Figure 10:
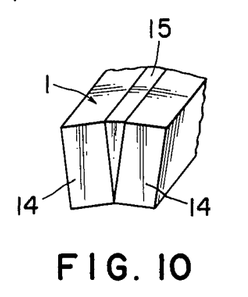
FIG. 10 is a partial perspective view showing an example of modification of the hard-metal block usable in the above mentioned method of the invention.

In the case where a large plate thickness of the transition insert is desired, it is necessary merely to increase the width of the above described blocks 7, 1, 7, and there is no necessity whatsoever of varying the bonding conditions. Furthermore, in place of an integrally formed hard-metal block 1 as used in the above described example, a hard-metal block 1 formed by inserting a wedge-shaped plate 15 in between a pair of hard-metal plates 14 as shown in FIG. 10 may be used.

Figure 9:
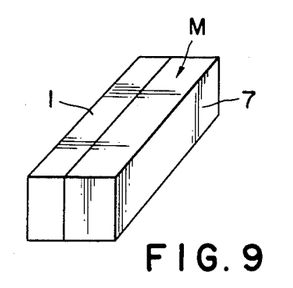
Figure 11:
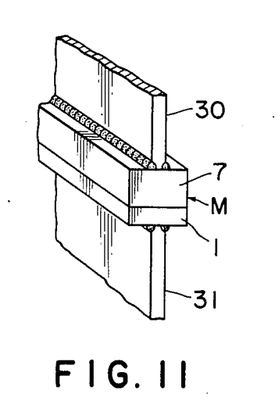
FIG. 11 is a fragmentary perspective view showing a state of application of the transition insert material.

The transition insert material M obtained as shown in FIG. 9 may be used, for example, as illustrated in FIG. 11 in which an upper skirt wall 30 of an aluminum alloy is welded to a lower skirt wall 31 of steel through the transition insert material M. Since the upper and lower parts 7 and 1 of the material M are made of an aluminum alloy and a stainless steel, respectively, the welding between the part 7 and the wall 30, and between the part 1 and the wall 31, can be carried out easily.

Figure 6A:
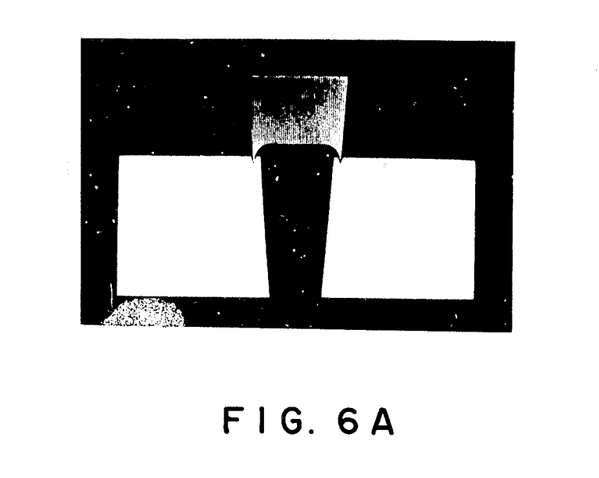
FIGS. 6A and 6B are photographic end views showing the metallic structures of the hard-metal and soft-metal blocks respectively prior to and after the bonding process.
Figure 6B:
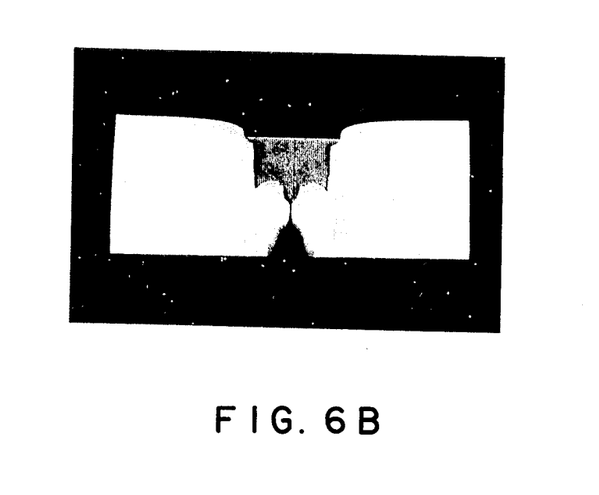

The metallic structures of these soft-metal and hard-metal blocks in their states prior to bonding are shown in FIG. 6A, and those after bonding are shown in FIG. 6B.

Figure 12:
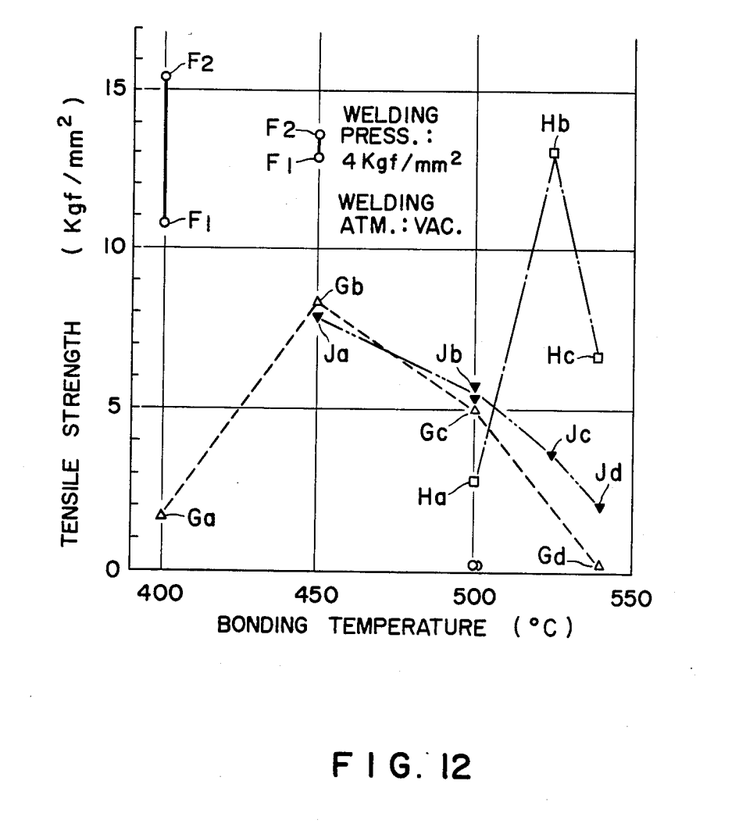
FIG. 12 is a graph indicating values of joint strength obtained by the bonding method according to this invention in comparison with those obtained by other bonding methods.
Figure 13:
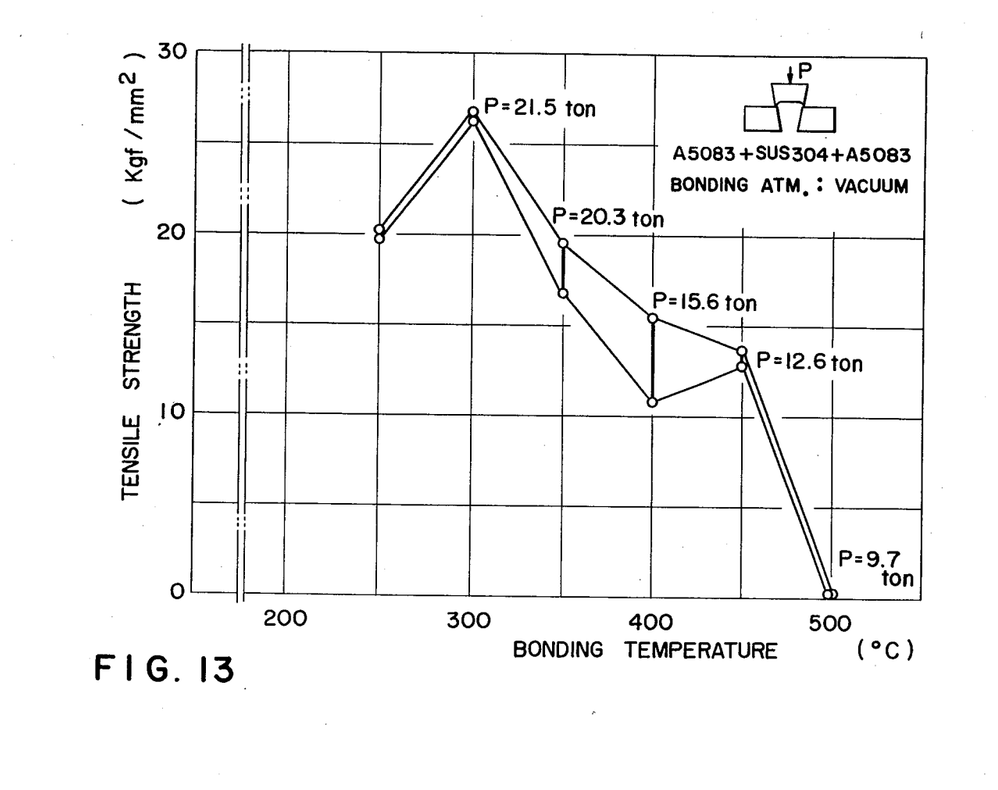
FIG. 13 is a similar graph showing joint strengths obtained by the method of this invention.

A number of combinations of a stainless steel (SUS 304, JIS) and an aluminum alloy (A 5083, JIS) were experimentally bonded according to the method of this invention as described above and by other comparative methods, and each of the resulting joints was subjected to a tension test to fracture, whereupon the results indicated in FIGS. 12 and 13 were obtained.

Figure 14:
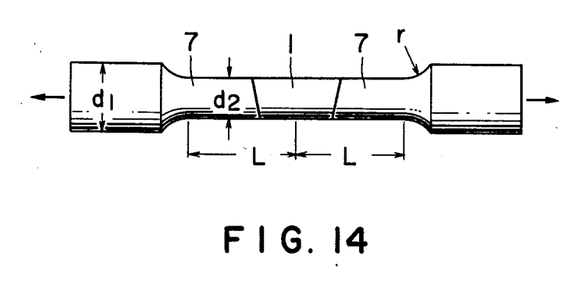
FIG. 14 is a side view of an example of the test pieces used in obtaining the results shown in FIGS. 12 and 13.

FIG. 14 shows the shape of test pieces used. The dimensions of the test pieces were as follows:
d1 = 15 mm; d2 = 10 mm
r = 15 mm; and l = 25 mm.

In the case of the test pieces obtained from the transition insert materials produced by the method of this invention, a rod portion 1 of the stainless steel (hard metal) was interposed between a pair of rod portions 7 of the aluminum alloy (soft metal). Such test pieces were subjected to tension tests. During the tension tests, one of the two bonded joints between the rod portions 1 and 7 of the test pieces was first fractured. Thereafter, the remaining part of the test pieces consisting of still joining portions 1 and 7 was subjected to the tension tests for second fracture. Such first and second fracture points are indicated at F1 and F2, respectively in FIG. 12. It will be noted that the first and second fracture points change depending upon the bonding temperature used.

Figure 15:
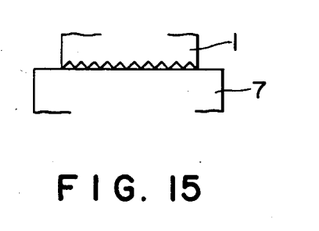
FIG. 15 is a view showing the shapes of blocks which were bonded together by a modified conventional method to obtain test pieces to be used for comparison tests.

For comparison purposes, a stainless steel block 1 (SUS 304, JIS) and an aluminum alloy block 7 (A 5052, JIS) were combinedly bonded by a modified conventional diffusion welding method at a welding pressure of 4 Kgf/mm$^2$ under vacuum, the stainless steel block 1 being preliminarily formed with a bonding surface of triangular wave form in cross section as shown in FIG. 15, the wave height being 1 mm. The triangular wave form was used for the purposes of destroying surface oxide of the aluminum alloy blocks and of increasing the area of contact between the stainless steel block and aluminum alloy block, and the blocks were heated in a state wherein the wave form of the stainless steel block has been urged forcibly into the aluminum alloy block. The thus bonded two blocks were machined to have the shape and dimensions of test piece as shown in FIG. 14, which were subjected to tension tests. The fracture points in these tests are indicated at Ga, Gb, Gc and Gd in FIG. 12.

Figure 16:
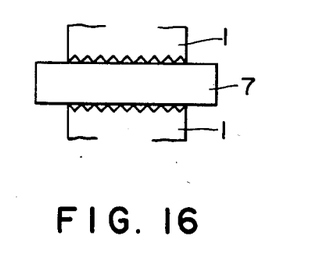
FIG. 16 is a view similar to FIG. 15, showing the shapes of other blocks which were also bonded together for comparison purposes.

For further comparision, an aluminum alloy block 7 (A 3003, JIS) was bonded to a stainless steel block 1 (SUS 304, JIS) on the opposite sides thereof as indicated in FIG. 16 by a modified conventional diffusion welding method at a welding pressure of 4 Kgf/mm$^2$ under vacuum, each stainless steel block 1 being preliminarily formed with a bonding surface of triangular wave form in cross section with a wave height of 2 mm. The thus bonded three blocks were machined to have the shape and dimensions of test piece as shown in FIG. 14, which were subjected to tension tests. The fracture points in these tests are indicated at Ha, Hb and Hc in FIG. 12.

For still further comparison, the same test pieces as above except for the use of a different aluminum alloy (A 2219, JIS) and a different stainless steel (SUS 304, JIS) were produced and subjected to tension tests. The fracture points in these tests are as indicated at Ja, Jb, Jc and Jd in FIG. 12.

As is apparent from FIG. 12, by the practice of the above described diffusion welding method according to this invention, joint strength is greatly improved in comparison with those attainable by the conventional methods.

FIG. 13 shows results of tension tests carried out for the test pieces produced according to this invention. FIG. 13 indicates that the joint strength at a bonding temperature of 500° C. drops remarkably. It may be considered that the reasons for this are that intermetallic compounds are formed in great quantity because of the rapid Al-Fe reaction between the newly formed surface of the aluminum and the bonding surface of the stainless steel due to the high temperature, and that the pressing force P at the time of bonding decreased because of a drop in the yield point of the aluminum caused by the temperature rise. Accordingly, there arises the possibility of improvement of strength by a measure such as shortening the time for holding the blocks together or restrainingly holding the aluminum at its top and bottom and applying force from its sides.

Figure 17:
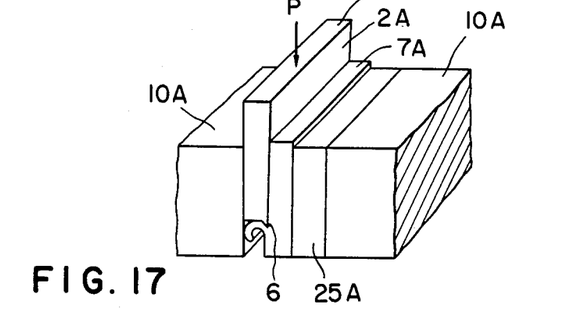
FIG. 17 is a fragmentary perspective view explanatory of a modified method according to this invention.

In the method described hereinabove, two soft-metal blocks 7 are used to be acted upon by a single hard-metal block 1. However, a single soft-metal block 7A may be used instead of two blocks as shown in FIG. 17. In the method shown in FIG. 17, a hard-metal block 1A having a taper part 2A is forced downward with a pressing force P relative to the single soft-metal block 7A to pare or peel off a surface layer of the block 7A by the edge 6. For the purpose of heating the blocks 1A and 7A, an electric heater panel 25A is provided in face-to-face contact with that surface of the block 7A remote from the block 1A. The two blocks 1A and 7A and the heater panel 25A are restrainingly held from opposite sides by means of jigs 10A.

Figure 18:
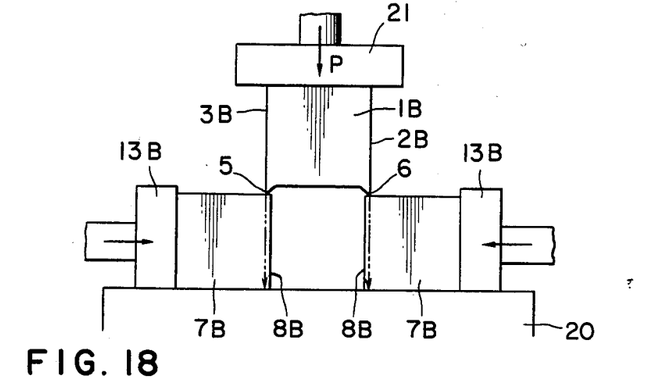
FIG. 18 is a fragmentary elevational view explanatory of a further modified method according to this invention.

FIG. 18 shows a further modified method in which the hard-metal block 1B has parallel side flank surfaces 2B and 3B instead of the taper surfaces 2 and 3 as shown in FIG. 3. Further, the two soft-metal blocks 7B have parallel flank surfaces 8B which are also parallel to the side flank surfaces 2B and 3B. When the hard-metal block 1B is forced downwardly, the soft-metal blocks 7B are peeled along the chain lines as shown.

Instead of using a rigid jig 10 for restraining the blocks, two side walls 13B of the jig may be movable and forced toward the adjoining soft-metal blocks 7B, respectively, as shown in FIG. 18, by means of hydraulic or mechanical means (not shown). By forcing the side walls 13B as above, welding pressure is produced between the bonding surfaces of the blocks 1B and 7B.

Figure 19:
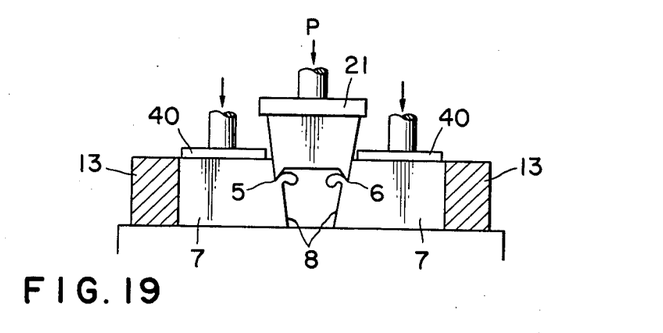
FIG. 19 is also a fragmentary elevational view, partly in section, explanatory of a still further modified method according to this invention.

The soft-metal blocks 7 may be held restrainingly also in the vertical direction as shown in FIG. 19. In the example shown in this figure, downward force is applied to the soft-metal blocks 7 by means of press members 40 which are operated hydraulically or mechanically.

While some preferred examples of practice of the method of bonding together dissimilar materials according to this invention have been described above, it is to be understood that the method of this invention is not limited to the details of the above described examples but can be practiced in variously modified modes.

For instance, while examples of a transition insert in which an aluminum alloy is used as the soft metal and a stainless steel is used as the hard metal have been described above, the kinds of metals and uses of the fabricated products are not limited to these, it being possible to apply the method of this invention to the bonding of a variety of metals beginning with copper alloys and other alloys. Further, it is possible to apply the method of this invention to the bonding of ceramic materials.

In one instance, for example, a mild steel ("rolled steel for welded structures", JIS designation, Class 1, SM41A) or 9% Nickel steel as a hard metal and an aluminum alloy (JIS designation A 5083) as a soft metal were bonded together at a bonding temperature of 300° C., and the joint thus made subjected to a tension test, whereupon the base material of the aluminum alloy fractured. The tensile strength (bearing stress) in this case was 31.9 Kgf/mm$^2$ when mild steel was used, and 31.8 Kgf/mm$^2$ when 9% Nickel steel was used, from which it is apparent that the strength of both joined interfaces of the joint created by diffusion welding according to this invention is higher than the above values.

In another instance, a stainless steel (SUS 304, JIS) as a hard metal and "pure" aluminum (A 1050, JIS) as a soft metal were bonded together at a bonding temperature of 300° C., and the resulting joint was subjected to a tension test, whereupon the fracture occurred in the "pure" aluminum base material. The tensile stress at fracture in this case was 8.08 Kgf/mm$^2$, from which it is apparent that the strength of both joined interfaces of the joint created by diffusion welding of a stainless steel and a "pure" aluminum according to this invention is higher than the above value.

Furthermore, the forming of the newly formed surfaces and the bonding are carried out in a vacuum in the examples of practice described hereinabove, but it is also possible to carry out these procedures in an atmosphere other than a vacuum such as, for example, an inert gas and the natural atmosphere. While the newly formed surfaces are formed after the blocks have been heated to a temperature of 200° to 500° C. in the above examples, a procedure wherein the newly formed surfaces are first formed at room temperature, and then heating is carried out to the desired temperature may be followed. In this case, if the jig shown in FIG. 3 is used, the development of pressing force arising from the thermal expansion of the blocks due to the heating can be expected. Of course, this heating for the purpose of bonding may be unnecessary in certain cases.

Furthermore, for forming newly formed surfces as described above, it is not necessary to provide sharp edges on the hard-metal side, the important point being to provide edges that are of an order capable of peeling or shaving the surface layer of the soft-metal member. Similarly the tapered parts and grooves on the soft-metal side as described above may be omitted in some cases.

By the practice of this invention as described above, a high joint strength in joints between dissimilar materials can be attained in relatively simple and economical manner and, moreover, without restriction of the kinds and thicknesses of the alloys.

The chemical compositions of aluminum and most of the aluminum alloys mentioned in the foregoing disclosure are as in Table 1.

TABLE 1

| JIS DESIG-NATION | CHEMICAL CONTENT, % (max. or range) | | | | | | | | | Al % (min.) |
|---|---|---|---|---|---|---|---|---|---|---|
| | Cu | Si | Fe | Mn | Mg | Zn | Cr | Ti | Others (total) | |
| A 1050 | 0.05 | 0.25 | 0.40 | 0.05 | 0.05 | 0.05 | — | 0.03 | — | 99.50 |
| A 1100 | 0.05–0.20 | Si + Fe, | 1.0 | 0.05 | — | 0.10 | — | — | 0.15 | 99.00 |
| A 3003 | 0.05–0.20 | 0.6 | 0.7 | 1.0–1.5 | — | 0.10 | — | — | 0.15 | Remainder |
| A 5052 | 0.10 | Si + Fe, | 0.45 | 0.10 | 2.2–2.8 | 0.10 | 0.15–0.35 | — | 0.15 | Remainder |
| A 5083 | 0.10 | 0.40 | 0.40 | 0.30–1.0 | 4.0–4.9 | 0.25 | 0.05–0.25 | 0.15 | 0.15 | Remainder |

The chemical composition of the "mild steel" SM41A mentioned hereinbefore is as set forth in Table 2.

TABLE 2

ROLLED STEEL FOR WELDED STRUCTURES,
JIS Designation Class 1, SM41A
Contents by %

| Thickness (mm) | C (max.) | Si | Mn (min.) | P (max.) | S (max.) |
|---|---|---|---|---|---|
| 50 (max.) | 0.23 | — | 2.5 × C | 0.040 | 0.040 |
| 50 (min.) 100 (max.) | 0.25 | — | 2.5 × C | 0.040 | 0.040 |

What is claimed is:

1. A method of bonding a hard-material structure to a soft-material structure, both in solid form, which comprises the steps of peeling an outer layer of a surface of the soft-material structure continuously with an edge of a bonding surface of the hard-material structure, while said bonding surface is pressed face to face against, and moved relative to said surface of the soft-material structure, thereby creating a fresh surface of the soft-material structure, and pressing together said bonding surface and said fresh surface.

2. A method of bonding as claimed in claim 1 wherein said soft-material structure is a single soft-material block and the hard-material structure is also a single hard-material block.

3. A method of bonding as claimed in claim 1, further comprising the step of heating the hard-material structure and the soft-material structure.

4. A method of bonding as claimed in claim 3 wherein the temperature of the heating is in the range of 200° to 450° C.

5. A method of bonding as claimed in claim 4 wherein said temperature is in the range of 250° to 350° C.

6. A method of bonding as claimed in claim 1 wherein the hard-material and soft-material structures are bonded under vacuum.

7. A method of bonding as claimed in claim 1 wherein the hard-material and soft-material structures are bonded at atmospheric pressure.

8. A method of bonding as claimed in claim 1 wherein the hard-material and soft-material structures are made of hard metal and soft metal, respectively.

9. A method of bonding as claimed in claim 8 wherein the hard metal is a stainless steel or a low alloy steel and the soft metal is an aluminum base alloy or aluminum.

10. A method of bonding a hard-material structure to a soft-material structure, both in solid form, which comprises the steps of providing said soft-material structure in the form of a pair of soft-material blocks constrainingly placed side-by-side with a space interposed therebetween such that the opposing flank surfaces thereof confront each other; providing said hard-material structure as a hard-material block having opposite flank surfaces each constituting a bonding surface having an edge; causing said hard material block to be pressed into said space in such a manner that the edges of the opposite bonding surfaces thereof move relative to said confronting flank surfaces of the soft-material blocks while peeling surface layers of the confronting flank surfaces thereby creating fresh surfaces thereon; and pressing together said bonding surface and said fresh surfaces.

11. A method of bonding as claimed in claim 10 wherein the opposing flank surfaces of the hard-material block are tapered surfaces converging toward their edges.

12. A method of bonding as claimed in claim 11 wherein the pressing together of the bonding surface and the fresh surface is carried out by restraining the soft-material blocks with a jig and by a wedge effect produced by the tapered surfaces of the soft-material and hard-material blocks.

13. A method of bonding as claimed in claim 12 wherein the soft-material blocks are restrained also in the direction of relative movement of the soft-material blocks and the hard-material block.

14. A method of bonding as claimed in claim 2 wherein the soft-material block is restrained by a jig with a wedge-shaped space formed between the block and the jig, and the hard-material block is shaped in the form of a wedge and pressed into said space.

15. A method of bonding as claimed in claim 10 wherein the opposing flank surfaces of the hard-material block are parallel to each other and the confronting flank surfaces of the soft-material blocks are also parallel to each other, and wherein the soft-material blocks are pressed toward the space therebetween.

* * * * *